United States Patent
Goto et al.

[11] Patent Number: 5,151,454
[45] Date of Patent: Sep. 29, 1992

[54] PHOTOCURABLE ADHESIVE OF HYDROXY-POLYESTERURETHANE ACRYLATE, MONOMER AND POLYISOCYANATE

[75] Inventors: Jugo Goto, Kawanishi; Tsutomu Kubota, Mishima; Reiichi Kotani, Suita; Masuo Miyaji, Izumi, all of Japan

[73] Assignee: Takeda Chemical Industries, Ltd., Osaka, Japan

[21] Appl. No.: 815,622

[22] Filed: Dec. 30, 1991

Related U.S. Application Data

[63] Continuation of Ser. No. 496,174, Mar. 20, 1990, abandoned, which is a continuation of Ser. No. 35,025, Apr. 6, 1987, abandoned.

[30] Foreign Application Priority Data

Apr. 11, 1986 [JP] Japan .................. 61-84546
Apr. 11, 1986 [JP] Japan .................. 61-84547

[51] Int. Cl.$^5$ ............ C08F 2/50; C08F 226/02; C08F 283/04
[52] U.S. Cl. ............. 522/93; 522/96; 522/97; 525/440; 528/65; 528/66
[58] Field of Search ................. 522/93, 96

[56] References Cited

U.S. PATENT DOCUMENTS

| | | | |
|---|---|---|---|
| 3,891,523 | 6/1975 | Hisamatsu | 522/96 |
| 4,072,770 | 2/1978 | Ting | 522/96 |
| 4,212,901 | 7/1980 | Van Neerbos | 522/107 |
| 4,235,686 | 11/1980 | Dart | 522/108 |
| 4,353,980 | 10/1982 | Helling | 522/97 |
| 4,415,604 | 11/1983 | Nativi | 522/174 |
| 4,424,252 | 1/1984 | Nativi | 427/54.1 |
| 4,608,400 | 8/1986 | Yokoshima | 522/96 |
| 4,789,620 | 12/1988 | Sasaki | 522/103 |

FOREIGN PATENT DOCUMENTS

| | | | |
|---|---|---|---|
| 0154819 | 9/1985 | European Pat. Off. | 522/96 |
| 1595580 | 8/1981 | United Kingdom | 522/96 |

*Primary Examiner*—Marion E. Camish
*Assistant Examiner*—Arthur H. Koeckert
*Attorney, Agent, or Firm*—Wenderoth, Lind & Ponack

[57] ABSTRACT

A method of profile lapping adhesion which comprises: coating on a film or sheet, or a substrate, or both of these an adhesive composition which comprises:
(a) an epoxy resin or an isocyanate compound,
(b) a curing agent for the epoxy resin or the isocyanate compound, and
(c) a photopolymerizable vinyl compound:
irradiating the adhesvie compoisiton;
laminating the sheet or film to the substrate while the sheet or film is wrapped around the substrate; and curing the adhesive composition.

An adhesive composition especially suitable for use in the profile lapping adhesion is provided, which comprises:
(a) a photopolymerizable compound which has a number average molecular weight of not less than about 3000 and at least one photopolymerizable double linkage in the molecule;
(b) a photopolymerizable monomer which has a molecular weight of about 200-800; and
(c) an isocyanate compound.

The photopolymerizable compound may be in part or in total displaced by a non-photopolymerizable compound which has a number average molecular weight of not less than about 5000.

The adhesive composition develops a large primary adhesive strength by being irradiated, and further the adhesive develops a strong adhesion by chemical cure of the isocyanate compound.

3 Claims, 2 Drawing Sheets

PHOTOCURABLE ADHESIVE OF HYDROXY-POLYESTERURETHANE ACRYLATE, MONOMER AND POLYISOCYANATE

This application is a continuation of now abandoned application Ser. No. 07/496,174 filed on Mar. 20, 1990 which is a continuation of now abandoned Ser. No. 07/035,025 filed Apr. 6, 1987 now abandoned.

This invention relates to a method of adhesion in profile lapping, and an adhesive composition used therein, more particularly an adhesive composition which forms an adhesive especially large in primary adhesive strength when it is irradiated in profile lapping process.

The profile lapping refers to a process in which a decorative thin sheet such as a resin-coated paper or a resin sheet is continuously lapped on or wrapped around a substrate of, for example, plywoods, plates of inorganic materials or wooden fibers which have curved or uneven surfaces while concurrently the thin sheet is adhered or laminated onto the curved or uneven surfaces of the substrate, as is described in, for instance, Japanese Patent Publication No. 61-5895. The thus obtained products are widely used as quasi-wood materials in, for example, household goods and construction materials.

The adhesive employed in the profile lapping is required to have a large primary adhesive strength since a thin sheet must be adhered firmly without lifting on the uneven surfaces of a substrate. Therefore, a solvent adhesive which contains an organic solvent therein has been usually used in the profile lapping adhesion. In this profile lapping where a solvent adhesive is used, a dry lamination method is usually adopted. That is, the adhesive is first coated on a thin sheet, dried and then the sheet is roll-pressed to a substrate. However, since the dry lamination method includes a drying step of the adhesive where a large amount of the solvent is evaporated, measures to prevent air pollution due to the evaporated solvent are inevitably needed.

Moreover, there arise problems in the method such as insufficient adhesion or shortage of primary adhesive strength depending upon the degree of drying the adhesive, and thus it is difficult to attain a fixed and stable adhesion between the sheet and the substrate. For instance, when the solvent adhesive is completely dried to leave no solvent in the adhesive after the coating on the sheet, the adhesive is poorly wettable on the substrate, resulting in an insufficient adhesion of the sheet to the substrate. When the adhesive is insufficiently dried to leave the solvent in excess on the sheet, then the adhesive is short of primary adhesive strength, which is however specifically required in the profile lapping adhesion. Further, when the substrate does not readily absorb the solvent, there is generated lifting on the resultant profile lapped products.

To solve the problems as described above in the dry lamination method, a method has been proposed in which a hot melt adhesive is used. Although there is no need of evaporating a solvent from the adhesive in this method, but since the hot melt adhesive is originally such that it is used after being heated to melt to such high temperatures as about 100°–250° C., sheets or substrates to be employed are limited to those which are heat-resistant at such high temperatures. Therefore, polyvinyl chloride sheet, for example, is unusable in the profile lapping adhesion in which a hot melt adhesive is used because of insufficient heat resistance of the sheet.

On the contrary, a solventless adhesive is of late widely used in a variety of fields since it is free from the problem of solvents. However, the solventless adhesive also has disadvantages. For instance, a two part solventless adhesive is short in pot life after mixing the components so that it has weakness in workability. Further it is insufficient in primary adhesive strenth or bond strength, so that it develops only a very small adhesive strength immediately after laminating sheets to substrates.

To solve the problems as set forth above, a two stage reactive adhesive has been proposed in, for example, Japanese Patent Disclosure (Unexamined) No. 60-168776, which is a solventless or high solids adhesive composed of a non-photopolymerizable component, a curing agent for the component and a photopolymerizable component. It is said that such an adhesive develops a large primary adhesive strength when it is irradiated to cause the polymerization of the photopolymerizable component in the adhesive, and consequently a thin resin sheet can be adhered onto a substrate without lifting or separating. It is further said that the subsequent cure of the non-photopolymerizable component by the curing agent ensures a strong adhesion between the resin sheet and the substrate. However, the recent profile lapping process requires an adhesive composition which is more large in primary adhesive strength, and further more hygienic in use.

The present inventors have made an intensive study to solve the above problems in the conventional profile lapping adhesion, and have found out a method which is sipmle in operation and is applicable to sheets insufficient in heat resistance, but also freed of air pollution.

The inventors have further investigated two stage reactive adhesive compositions to meet the above requirements, and have found out that a composition which comprises a photopolymerizable and/or a non-photopolymerizable compound having a specified number average molecular weight, a photopolymerizable monomer having a specified molecular weight and an isocyanate compound develops a large primary adhesive strength between adherends immediately after being irradiated, and furthermore, the adhesive composition finally develops a strong adhesion by chemical cure of the isocyanate compound.

It is, therefore, an object of the invention to provide a method of profile lapping adhesion.

It is also an object of the invention to provide an adhesive composition which develops a large primary adhesive strength by being irradiated, and further forms a strong adhesion between substrates by subsequent chemical cure of the adhesive composition, and which is, therefore, suitable for use in the profile lapping adhesion.

The method of profile lapping adhesion of the invention comprises:
  coating on a film or sheet, or a substrate, or both of these, an adhesive composition which comprises:
  (a) an epoxy resin or an isocyanate compound,
  (b) a curing agent for the epoxy resin or the isocyanate compound, and
  (c) a photopolymerizable vinyl compound;
  irradiating the adhesive composition;

laminating the sheet or film to the substrate while the sheet or film is wrapped around the substrate; and curing the adhesive composition.

The epoxy resin herein is such a resin which contains no solvent or contains solids in a high content, and includes, for example, bisphenol A types, bisphenol F types, hydrogenated bisphenol A types, novolac types, glycidyl ether types such as polyglycidyl ethers of polyalkylene glycols, e.g., diglycidyl ether of neopentyl glycol, glycidyl amine types such as triglycidyl isocyanurate or tetraglycidyl-m-xylenediamine, glycidyl ester types such as polyglycidyl esters of polycarboxylic acids, e.g., diglycidyl phthalate or diglycidyl hexahydrophthalate, alicyclic types such as vinylcyclohexene dioxide, 3,4-epoxycyclohexylmethyl(3,4-epoxycyclohexane)carboxylate or bis(3,4-epoxy-6-methylcyclohexylmethyl)adipate.

In addition to the above, epoxy resins usable in the invention further include those which contain epoxy groups therein as obtained by the reaction of epoxy resins such as described above with polybasic acids or polyester polycarboxylic acids, polyglycidyl esters of polyester polycarboxylic acids, and polyglycidyl ethers of polyester polyols.

The polybasic acids usable in the above reactions are exemplified by maleic acid (anhydride), succinic acid (anhydride), adipic acid, fumaric acid, phthalic acid (anhydride), terephthalic acid, isophthalic acid, methyltetrahydrophthalic acid (anhydride), tetrahydrophthalic acid (anhydride), sebacic acid, dodecanedioic acid, azelaic acid, glutaric acid, trimellitic acid (anhydride), hexahydrophthalic acid (anhydride) and dimer acids.

The polyester polycarboxylic acids and polyester polyols are esterification products obtainable by a conventional manner of polybasic carboxylic acids as above with polyhydric alcohols such as ethylene glycol, propylene glycol, butylene glycol, hexylene glycol, decanediol, neopentyl glycol, glycerine, trimethylolpropane, 1,4-cyclohexanedimethanol, neopentyl glycol ester of hydroxypivalic acid, 1,4-cyclohexanediol or hydrogenated bisphenol A.

Examples of the curing agents usable include aliphatic polyamines such as diethylenetriamine, triethylenetetramine, tetraethylenepentamine, dipropylenediamine, diethylaminopropylamine, menthane diamine or isophorone diamine; aromatic polyamines such as xylylenediamine, m-phenylenediamine, diaminodiphenylmethane or diaminodiphenyl sulfone; polyamide amines as obtained by the reaction of dimer acids with diamines; mercaptans such as trimethylolpropane tris($\beta$-thiopropionate) or a compound as represented by the formula of in which R represents an aliphatic hydrocarbon group, and n is 1 or 2; acid anhydrides such as maleic anhydride, phthalic anhydride, trimellitic anhydride, dodecylsuccinic anhydride, methylhexahydrophthalic anhydride or methyl acid anhydride; polybasic acids such as dimer acids or octadecane dicarboxylic acid; and epoxy polymerization catalysts such as 2,4,6-tris(dimethylaminomethyl)phenol, benzyldimethylamine or imidazole. The curing agent usable further includes dicyandiamine, organic acid dihydrazides and phenol resins. These curing agents may be used singly or as a mixture.

The epoxy resins and the curing agents therefor are contained in total in amounts of about 10-90% by weight in the adhesive composition used in the method of the invention.

The formulating ratios of the epoxy resin to the curing agent, which includes photopolymerizable vinyl monomers, which will be described hereinafter, when they act also a curing agent, are as follows: in the case where the curing agent is an amine, the ratio of the number of the epoxy groups of the epoxy resin to the number of the active hydrogens of the amino groups is in the range of about 0.1-3.0; in the case where the curing agent is a mercaptan, the ratio of the number of the epoxy groups of the epoxy resin to the number of the thiol groups is in the range of about 0.1-3.0; in the case where the curing agent is an acid anhydride, the ratio of the number of the epoxy groups of the epoxy resin to the number of the anhydride groups is in the range of about 0.1-3.0; and in the case where the curing agent is a polybasic carboxylic acid, the ratio of the number of the epoxy groups of the epoxy resin to the number of the carboxyl groups is in the range of about 0.1-3.0.

The isocyanate compounds used in the method of the invention are solventless liquids or high solids solutions. They include aromatic, aliphatic, alicyclic and aromaticaliphatic isocyanates, such as tolylenediisocyanate, diphenylmethanediisocyanate, either crude or purified, 3,3'-dimethyldiphenylmethane-4,4'-diisocyanate, naphthylene-1,5-diisocyanate, phenylenediisocyanate, xylylenediisocyanate, 1,6-hexamethylenediisocyanate, 1,4-tetramethylenediisocyanate, isophorone diisocyanate, hydrogenated tolylenediisocyanate, hydrogenated diphenylmethane diisocyanate, hydrogenated xylylenediisocyanate, dimers, trimers or biuret compounds of these diisocyanates, or adducts of compounds having active hydrogens therein to the isocyanates.

A variety of compounds having active hydrogens therein are usable for the production of the adducts, and the compounds include polyols such as ethylene glycol, propylene glycol, tetramethylene glycol, neopentyl glycol, butanediol, 1,6-hexanediol, polyethylene glycol, polypropylene glycol, polytetramethylene ether glycol, trimethylolpropane, glycerine, pentaerythritol, castor oil, bisphenol A-ethylene oxide adducts or bisphenol A-propylene oxide adducts; and polyester polyols.

The polyester polyols may be produced by the reaction of a polybasic carboxylic acid (anhydride) with a polyhydric alcohol. The polybasic carboxylic acids (anhydrides) usable include, for example, maleic acid (anhydride), succinic acid (anhydride), adipic acid, fumaric acid, phthalic acid (anhydride), terephthalic acid, isophthalic acid, methyltetrahydrophthalic acid (anhydride), tetrahydrophthalic acid (anhydride), sebacic acid, dodecanedioic acid, azelaic acid, glutaric acid, trimellitic acid (anhydride), hexahydrophthalic acid (anhydride) and dimer acids. The polyhydric alcohol usable includes, for example, aliphatic glycols such as ethyleneglycol, propyleneglycol, butyleneglycol, hexyleneglycol, decanediol or neopentyl glycol; aliphatic polyether glycols such as diethyleneglycol or dipropyleneglycol; and others such as glycerine, trimethylolpropane, 1,4-cyclohexanedimethanol, neopentyl glycol ester of hydroxypivalic acid, 1,4-cyclohexanediol or hydrogenated bisphenol A.

When a photopolymerizable vinyl compound, which is a component in the adhesive composition used in the method of the invention, and will be described hereinafter, has functional groups which are reactive to isocyanate groups, such as hydroxyls or aminos, the reaction products of the photopolymerizable vinyl compounds with the isocyanate compounds have isocyanate groups as well as photopolymerizable vinyl groups therein, and can act both as an isocyanate compound and a photopolymerizable vinyl compound. In other words, the resultant photopolymerizable vinyl compound can be used as it is as an isocyanate compound.

The isocyanate compounds as above may be used singly or as a mixture.

The curing agent for the isocyanate compound usable in the method of the invention includes, for instance, polyols such as ethylene glycol, propylene glycol, tetramethylene glycol, neopentyl glycol, butanediol, 1,6-hexanediol, polyethylene glycol, polypropylene glycol, polytetramethylene ether glycol, trimethylolpropane, glycerine, pentaerythritol, bisphenol A-ethylene oxide adducts or bisphenol A-propylene oxide adducts; and polyester polyols.

The polyester polyols may be produced by the reaction of a polybasic carboxylic acid (anhydride) with a polyhydric alcohol. The polybasic carboxylic acid (anhydride) usable include, for example, maleic acid (anhydride), succinic acid (anhydride), adipic acid, fumaric acid, phthalic acid (anhydride), terephthalic acid, isophthalic acid, methyltetrahydrophthalic acid (anhydride), tetrahydrophthalic acid (anhydride), sebacic acid, dodecanedioic acid, azelaic acid, glutaric acid, trimellitic acid (anhydride), hexahydrophthalic acid (anhydride), and dimer acids; and the polyhydric alcohol usable includes, for example, aliphatic glycols such as ethylene glycol, propylene glycol, butylene glycol, hexylene glycol, decanediol or neopentyl glycol; aliphatic polyether glycols such as diethylene glycol or dipropylene glycol; and further glycerine, trimethylolpropane, 1,4-cyclohexanedimethanol, neopentyl glycol ester of hydroxypivalic acid, 1,4-cyclohexanediol or hydrogenated bisphenol A.

Acrylic polymers which have hydroxyl and/or aminos as side chains are also usable as a curing agent for the isocyanate compounds. Such acrylic polymers may be produced by a conventional vinyl polymerization or copolymerization of vinyl monomers containing hydroxyls such as N-methylol (meth)acrylamide, hydroxyethyl (meth)acrylate, hydroxypropyl (meth)acrylate, pentaerythritol mono(meth)acrylate, allyl alcohol, mono(meth)acrylate esters of polyethylene glycol, monovinyl ethers of ethylene glycol or polyethylene glycol, monovinyl ethers of propylene glycol or polypropylene glycol, Placcel FA-1 (Daicel Kagaku Kogyo K.K.) represented by the formula of $$CH_2=CHCOOCH_2CH_2OCO(CH_2)_5OH,$$

or vinyl monomers containing primary or secondary amino groups therein such as aminoethyl (meth)acrylate, N-methylaminoethyl (meth)acrylate, N-ethylaminoethyl(meth)acrylate, allylamine or diallylamine. The polymerization of these vinyl monomers are well known.

Also usable as a curing agent for the isocyanate compounds are copolymers which are obtained by conventional copolymerization of the above vinyl monomers which contain hydroxyl or amino groups, with vinyl monomers such as methyl (meth)acrylate, ethyl (meth)acrylate, n-butyl (meth)acrylate, isobutyl (meth)acrylate, 1-ethylpropyl (meth)acrylate, 1-methylpentyl (meth)acrylate, 2-methylpentyl (meth)acrylate, 3-methylpentyl (meth)acrylate, 1-ethylbutyl (meth)acrylate, 2-ethylbutyl (meth)acrylate, 2-ethylhexyl (meth)acrylate, isooctyl (meth)acrylate, 3,5,5-trimethylhexyl (meth)acrylate, decyl (meth)acrylate, dodecyl (meth)acrylate, tetrahydrofurfuryl (meth)acrylate, acrylic acid, methacrylic acid, maleic acid, maleic anhydride, fumaric acid, half ester of maleic acid, itaconic acid, glycidyl (meth)acrylate, glycidyl allyl ether, styrene, vinyl acetate, acrylonitrile, methacrylonitrile or various vinyl ethers.

When the photopolymerizable vinyl compound, which will be described hereinafter, contains functional groups such as hydroxyls or aminos which are reactive to isocyanate groups, the photopolymerizable vinyl compound may be used as it is as a curing agent for the isocyanate compounds, and accordingly in some cases there is no need of using a curing agent such as described hereinbefore.

The curing agent for the isocyanate compounds may be used singly or as a mixture.

The isocyanate compounds as above and the curing agents therefore are contained in total in amounts of about 5-100% by weight in the adhesive composition used in the method of the invention.

The formulating ratios of the isocyanate compounds to the curing agent are so adjusted that the number of the active hydrogens of the curing agent and, additionally the number of the active hydrogens also when the photopolymerizable vinyl compound used, which will be described hereinafter, contains active hydrogens such as hydroxyl hydrogens or amino hydrogens, to the number of the isocyanate groups of the isocyanate compounds be in the range of about 0.1-20, preferably in the range of about 0.1-5.0.

The photopolymerizable vinyl compound often referred to in the foregoing will now be described. The photopolymerizable vinyl compound has photopolymerizable vinyl groups therein, and exemplified by various vinyl monomers, poly(meth)acrylate esters, epoxy poly(meth)acrylates, polyester poly(meth)acrylates, polyurethane poly(meth)acrylates, polybutadiene poly(meth)acrylates, photopolymerizable vinyl oligomers and vinyl polymers.

The photopolymerizable vinyl monomers are exemplified by methyl (meth)acrylate, ethyl (meth)acrylate, n-butyl (meth)acrylate, isobutyl (meth)acrylate, 1-ethylpropyl (meth)acrylate, 1-methylpentyl (meth)acrylate, 2-methylpentyl (meth)acrylate, 3-methylpentyl (meth)acrylate, 1-ethylbutyl (meth)acrylate, 2-ethylbutyl (meth)acrylate, 2-ethylhexyl (meth)acrylate, isooctyl (meth)acrylate, 3,5,5-trimethylhexyl (meth)acrylate, decyl (meth)acrylate, dodecyl (meth)acrylate, tetrahydrofurfuryl (meth)acrylate, butoxyethyl (meth)acrylate, ethylcarbitol (meth)acrylate, methyl triglycol (meth)acrylate, phenoxyethyl (meth)acrylate, phenoxypropyl (meth)acrylate, glycerol mono (meth)acrylate, acrylic acid, methacrylic acid, maleic anhydride, fumaric acid, half ester of maleic acid, itaconic acid, N-methylol (meth)acryamide, hydroxyethyl (meth)acrylate, hydroxypropyl (meth)acrylate, pentaerythritol mono(meth)acrylate, allyl alcohol, mono(meth)acrylate ester of polyethylene glycol, mono(meth)acrylate ester of adducts of alkylene oxides to phenols or alkylphenols, e.g., an acrylate ester P-550A (by Kyoeisha Yushi Kogyo K.K., Japan) having the formula of monovinyl ethers of ethyleneglycol or polyethyleneglycol, monovinyl ethers of propyleneglycol or polypropyleneglycol, Placcel FA-1 as described hereinbefore, aminoethyl (meth)acrylate, N-methylaminoethyl (meth)acrylate, N,N-dimethylaminoethyl (meth)acrylate, N-ethylaminoethyl (meth)acrylate, N,N-diethylaminoethyl (meth)acrylate, allylamine, diallylamine, glycidyl (meth)acrylate, glycidyl allyl ether, styrene, vinyl acetate, acrylonitrile, methacrylonitrile, vinyl ethers, phenyl diethylene glycol (meth)acrylate, phenyl tetraglycol (meth)acrylate, 2-hydoxy-3-phenoxypropyl (meth)acrylate, and N-vinyl pyrrolidone.

The poly(meth)acrylate esters are exemplified by di-, tri- or tetraethylene glycol di(meth)acrylate, dipropylene glycol di(meth)acrylate, dipentamethylene glycol di(meth)acrylate, tetraethylene glycol di(meth)acrylate, tetraethylene glycol dichloroacrylate, glycerol tri(meth)acrylate, diglycerol di(meth)acrylate, diglycerol tetra(meth)acrylate, tetramethylene di(meth)acrylate, ethylene di(meth)acrylate, neopentyl glycol di(meth)acrylate, trimethylolpropane tri(meth)acrylate, pentaerythritol di(meth)acrylate, pentaerythritol tri(meth)acrylate, 1,6-hexanediol di(meth)acrylate, and NK Ester BPE-200 (Shin-Nakamura Kagaku Kogyo K.K., Japan) represented by the formula

The epoxy poly(meth)acrylates usable in the invention are obtainable by, for example, reacting a compound containing epoxy groups with acrylic acid or methacrylic acid. Therefore, some examples of the epoxy poly(meth)acrylates are Epoxy Ester 40EM (Kyoeisha Yushi Kogyo K.K., Japan), an adduct of methacrylic acid to an epoxy compound, represented by the formula

Epoxy Ester 70PA (Kyoeisha Yushi Kogyo K.K., Japan), an adduct of acrylic acid to an epoxy compound, represented by the formula

Epoxy Ester 80MFA (Kyoeisha Yushi Kogyo K.K., Japan), an adduct of acrylic acid to an epoxy compound, represented by the formula

Epoxy Ester 3002M (Kyoeisha Yushi Kogyo K.K., Japan), an adduct of methacrylic acid to an epoxy compound, represented by the formula and Epoxy Ester 3002A (Kyoeisha Yushi Kogyo K.K., Japan), an adduct of acrylic acid to an epoxy compound, represented by the formula

The polyester poly(meth)acrylates usable in the invention are obtainable by, for example, reacting a polyester polyol with acrylic acid or methacrylic acid, and are exemplified by HX-220 (Nippon Kayaku K.K., Japan) represented by the formula HX-620 (Nippon Kayaku K.K., Japan) represented by the formula wherein m and n are independently 1, 2 or 3, but m+n=4, and Biscoat 3700 (Osaka Yuki Kagaku Kogyo K.K., Japan) represented by the formula The polyurethane poly(meth)acrylates usable in the invention include, for example, the reaction products of diisocyanates, their dimers or trimers, or adducts of compounds containing active hydrogens therein to these isocyanate compounds, or polyester polyols, with vinyl monomers having hydroxyls therein.

The diisocyanate compounds usable in the above reaction may be the same as those described hereinbefore, and thus include, for example, aromatic, aliphatic, alicyclic and aromatic-aliphatic diisocyanates, such as tolylene diisocyanate, diphenylmethane diisocyanate, either crude or purified, 3,3'-dimethyldiphenylmethane-4,4'-diisocyanate, naphthylene-1,5-diisocyanate, phenylenediisocyanate, xylylenediisocyanate, 1,6-hexamethylenediisocyanate, 1,4-tetramethylenediisocyanate, isophoronediisocyanate, hydrogenated tolylenediisocyanate, hydrogenated diphenylmethanediisocyanate, hydrogenated xylylenediisocyanate, dimers, trimers or biuret compounds of these diisocyanates, or adducts of compounds having active hydrogens therein to these isocyanates.

The compounds having active hydrogens therein usable in the above reaction to produce adducts with the above-mentioned diisocyanates, their dimers or trimers are exemplified by ethylene glycol, propylene glycol, tetramethylene glycol, neopentyl glycol, butanediol, 1,6-hexanediol, polyethylene glycol, polypropylene glycol, polytetramethylene ether glycol, trimethylolpropane, glycerine, pentaerythritol, castor oil, bisphenol A-ethylene oxide adducts and bisphenol A-propylene oxide adducts.

Further the polyester polyol usable in the above reaction may be produced by the reaction of a polybasic carboxylic acid (anhydride) with a polyhydric alcohol.

The polybasic carboxylic acids (anhydrides) usable are exemplified by maleic acid (anhydride), succinic acid (anhydride), adipic acid, fumaric acid, phthalic acid (anhydride), terephthalic acid, isophthalic acid, methyltetrahydrophthalic acid (anhydride), tetrahydrophthalic acid (anhydride), sebacic acid, dodecanedioic acid, azelaic acid, glutaric acid, trimellitic acid (anhydride), hexahydrophthalic acid (anhydride), dimer acids; and the polyhydric alcohol usable are exemplified by aliphatic glycols such as ethylene glycol, propylene glycol, butylene glycol, hexylene glycol, decanediol or neopentyl glycol; aliphatic polyether glycols such as diethylene glycol or dipropylene glycol; others such as glycerine, trimethylolpropane, 1,4-cyclohexanedimethanol, neopentyl glycol ester of hydroxypivalic acid, 1,4-cyclohexanediol or hydrogenated bisphenol A.

The vinyl monomers containing hydroxyls include, for example, N-methylol (meth)acrylic amide, hydroxyethyl (meth)acrylate, hydroxypropyl (meth)acrylate, pentaerythritol mono(meth)acrylate, allyl alcohol, mono(meth)acrylate esters of polyethylene glycol, monovinyl ethers of ethylene glycol or polyethylene glycol, monovinyl ethers of propylene glycol or polypropylene glycol and Placcel FA-1.

These vinyl monomers are reacted with isocyanate group containing compounds as set forth hereinbefore usually in an equivalent ratio of hydroxyls of the vinyl monomer to isocyanate groups of the isocyanate compounds, thereby to produce polyurethane poly(meth)acrylates.

As a further example of the polyurethane poly(meth)acrylates is mentioned a compound having the general formula of wherein $R^1$ represents hydrogen or methyl, $R^2$ represents a component mainly composed of an urethane component, and $n_1$ and $n_2$ are independently 1, 2 or 3. Since this compound has both of hydroxyls and vinyl groups therein, it acts both as a photopolymerizable vinyl compound and as a curing agent for the isocyanate compounds.

The polybutadiene poly(meth)acrylates include (meth)acrylates obtainable by the reaction of polybutadienediol with acrylic acid or methacrylic acid, and hence are exemplified by Quinbeam 101 (Nippon Zeon K.K., Japan) having a vinyl equivalent of 355 and a viscosity of 21000 cps at 25° C.

As above described, a variety of photopolymerizable vinyl compounds are usable in the method of the invention, however, the photopolymerizable vinyl compounds which have not less than two photopolymerizable vinyl groups in the molecule, such as poly(meth)acrylate esters, epoxy poly(meth)acrylates, polyester poly(meth)acrylates, polyurethane poly(meth)acrylates or polybutadiene poly(meth)acrylates, are particularly preferred, since the use of these compounds makes it possible that the resultant adhesive composition develops adhesive strength within a short time after the irradiation.

However, a compound having the general formula of wherein $R^1$ represents hydrogen or methyl, $R^2$ represents a component mainly composed of an urethane component, acts both as a photopolymerizable vinyl compound and as a curing agent for the isocyanate compounds, and is one of the urethane (meth)acrylate compounds which are preferably used in the invention.

Among the above-mentioned photopolymerizable vinyl compounds, epoxy poly(meth)acrylates, polyester poly(meth)acrylates, polyurethane poly(meth)acrylates and polybutadiene poly(meth)acrylates have high viscosities. However, when these (meth)acrylates are used as a photopolymerizable compound, the use thereof in conjunction with another photopolymerizable vinyl compound can provide relatively low viscous solventless or high solids liquid adhesive compositions.

The adhesive composition used in the method of the invention contains the photopolymerizable vinyl compound in amounts of about 5–100% by weight, preferably about 20–80% by weight, based on the total weight of the adhesive composition.

The adhesive composition as set forth above is used as a two part adhesive in principle which is composed of a base resin component and a curing agent component. The photopolymerizable vinyl compound may be incorporated into either the base resin component or the curing agent component depending upon the reactivity of the photopolymerizable vinyl compound.

For instance, when the base resin is an epoxy resin, and when the curing agent is an amine or a mercaptan, the photopolymerizable vinyl compound is preferably contained in the base resin component since the addition of the photopolymerizable vinyl compound to the curing agent component causes Michael reaction between the vinyl compound and the curing agent, to lower the storability of the curing agent component. However, when the curing agent is an acid anhydride or a polybasic carboxylic acid, the photopolymerizable vinyl compound may be contained either in the base resin component or in the curing agent component.

When the base resin is an isocyanate compound and the photopolymerizable vinyl compound contains functional groups such as hydroxyls or aminos which are reactive to isocyanate groups, the base resin component is preferably contained in the curing agent component which is mainly composed of hydroxyl containing compounds because of the storability of the resin component, similarly to the case of above. However, the photopolymerizable vinyl compound may be contained in the resin component when the photopolymerizable vinyl compound contains no hydroxyls.

When the photopolymerizable vinyl compound has no functional groups such as hydroxyls therein, the adhesive composition may be a one part composition, since the mixture of the isocyanate compound as the base resin and the photopolymerizable vinyl compound is fairly storable. This one part adhesive composition develops adhesive strength derived from moisture curing after laminating a sheet to a substrate.

The adhesive composition used in the method of the invention is composed of three ingredients as described hereinbefore, and is a solventless or high solids liquid having a relatively low viscosity after admixing the ingredients, and therefore, can be coated readily and uniformly on a sheet or a substrate. Besides the above, the adhesive composition polymerizes rapidly by photoirradiation. The photoirradiation herein means the irradiation of light, usually ultraviolet light in the wavelength of about 180–460 nm. The source of such ultraviolet light includes low-, medium-, high- and ultrahigh-pressure mercury lamps, xenon lamps, ultraviolet fluorescent lamps and carbon arc lamps. When necessary, radiations such as alpha rays, beta rays, gamma rays, X-rays or electron rays are usable.

When the ultraviolet light is used to photopolymerize the adhesive composition, the composition usually contains photosensitizers, which are exemplified by benzoin compounds such as benzoin, benzoin methylether, benzoin ethylether, benzoin isobutylether or benzoin octylether; and carbonyl compounds such as benzil, diacetyl, diethoxyacetophenone, 2-hydroxy-2-methylpropiophenone, 4′-isopropyl-2-hydroxy-2-methylpropiophenone, methylanthraquinone, acetophenone, benzophenone, methyl benzoylformate, benzil methyl ketal or 1-hydroxycyclohexyl phenyl ketone, and 2-methyl-1-(4-(methylthio)phenyl)-2-morpholino)propene-1. These photosensitizers are used usually in amounts of about 0.01–20 parts by weight, preferably about 0.1–10 parts by weight, in relation to 100 parts by weight of the photopolymerizable compounds used. However, when ionizing radiation is used such as electron rays or gamma rays, the composition may not contain photosensitizers therein since the composition cures rapidly in the absence of photosensitizers by the irradiation to the composition.

The adhesive composition used in the invention may further contain therein, in addition to the foregoing, various additives which are known in the art, such as fillers, softeners, antioxidants, stabilizers, tackifiers, adhesion accelerators, organic solvents or plasticizers.

According to the method of the profile lapping of the invention, the adhesive composition as described above is preferably at first full coated on a sheet or film, and the layer of the composition is irradiated, and thereafter the sheet or film is lapped on or wrapped around a substrate while being laminated to the substrate, followed by curing of the adhesive composition. However, the adhesive composition may be coated on a substrate rather than a sheet or film, or the adhesive composition may be coated both on a sheet and a substrate when the substrate has flat or even surfaces.

In the invention, the sheet used, although not limited, is usually about 0.2–5 mm in thickness, whereas the film is usually not more than about 0.2 mm in thickness. The sheet and film usable include, for example, a resin sheet, a resin film, a decorative sheet, paper, cloth and metal foil.

The resin sheet and film may be composed of, for example, polyvinyl chloride resin, polyvinylidene chloride, polyethylene, polypropylene, polystyrene, ABS resin, polyamide, polyester, polyurethane, polyvinyl alcohol, ethylene-vinyl acetate copolymer or chlorinated polypropylene. The sheet or film may be colorless and transparent, or may carry thereon printed letters or patterns. The decorative laminates include sliced veneer and one that has melamine resin or the like impregnated therewith; the paper include imitation Japanese vellum, wood free paper, kraft paper, machine glazed paper, parchment, waterproof paper, glassine paper and corrugated board; the cloth includes cotton cloth, blankets and nonwoven fabric of various synthetic fibers; and the metal foil includes aluminum foil, titanium foil and copper foil.

The substrate to which the invention is applicable includes, for example, molds, laminates and structural bodies of wood, metal, resin or any combinations of these in any shape. The wood substrate may be of natural wood, lauan plywood, particle board or hardboard; the metal substrate may be of aluminum, iron or stainless steel; and the resin substrate may be of polyvinyl chloride resin, polyethylene, polypropylene, polystyrene, ABS resin, polyamide, polyester, polyurethane, polyvinyl alcohol, ethylene-vinyl acetate copolymer or chlorinated polypropylene.

The method of the invention is suitably applicable to lamination of sheet or film to substrates which have curved or uneven surfaces, however, it is apparent that the method is also applicable to substrates such as plates or square timbers which have flat surfaces.

In the method of the invention, the adhesive composition is coated on a sheet or film, or a substrate, or on both of these, in a thickness of about 0.1-1000 μm, preferably about 3-300 μm. Any coating method may be adopted to apply the adhesive composition to a sheet or film, for example, knife belt coating, floating knife coating, knife-over-roll coating, knife-on-blanket coating, spraying, dipping, kiss roll coating, squeeze coating, reverse roll coating, air blade coating or curtain roll coating.

According to the method of the invention, the layer of the adhesive composition on a sheet or film, or on a substrate, or on both of these, are irradiated for, for instance, about 0.1-60 seconds, so that the adhesive composition primarily cures, and as a result, the composition develops adhesive strength at room temperatures. When the sheet or film used is transparent, it may be irradiated from the back after the adhesive composition has been coated thereon. Then, while the composition retains the resultant adhesive strength, the sheet or film is wrapped around the substrate while it is laminated to the substrate by means of, for example, rolls.

Even when the adhesive composition develops no adhesion at room temperatures by the irradiation, the sheet or film can be laminated to a substrate by heating the adhesive surface or the substrate to about 80°-200° C., for example, so that the adhesive composition comes to have a sufficient adhesive strength, and then the sheet or film is laminated to the substrate.

The adhesive composition as set forth above used in the invention has, after the irradiation, a high primary adhesive strength. The primary adhesive strength is usually in the range of about 1-10 kg/25×25 mm² in terms of shear adhesion, and therefore the method ensures stable profile lapping adhesion which especially needs a high primary adhesive strength.

After the lamination of the sheet or film to the substrate as above described, the adhesive composition may be either secondarily cured by heating, or may be left standing at room temperatures to spontaneously moisture cure. The adhesive composition used in the invention contains a photocurable component and a chemically curable component, so that the secondary cure of the chemically curable component forms three dimensional structures of components, to provide a strong adhesion between the sheet or film and the substrate.

There is no limitation in combination of the sheet or film and the substrate, however, the combinations of a resin sheet or film and an wooden substrate; a resin sheet or film and a metallic substrate; and a decorative laminate and a wooden substrate, are particularly preferred.

According to the method of the invention as set forth above, the adhesive composition used is a solventless or a high solids composition, and further it is a two stage reactive composition which develops adhesive strength by being irradiated, so that a sheet or film can be laminated to a substrate immediately after the irradiation of the adhesive composition. Moreover, the profile lapping adhesion needs no step of evaporating organic solvents, and is therefore, simple, safe and hygienical in operation, but also it needs no step of controlling the amount of the solvent after applying to sheets or substrates, thereby ensuring to produce laminated products with no lifting of sheets or films.

Further according to the invention, there is provided, as an important aspect of the invention, a novel adhesive composition which is especially suitable in use for the profile lapping adhesion.

A first adhesive composition of the invention comprises:
(a) a photopolymerizable compound which has a number average molecular weight of not less than about 3000 and at least one photopolymerizable double linkage in the molecule;
(b) a photopolymerizable monomer which has a molecular weight of about 200-800; and
(c) an isocyanate compound.

Further according to the invention, the photopolymerizable compound may be in part or wholly displaced by a non-photopolymerizable compound which has a number average molecular weight of not less than about 5000.

Therefore, a second adhesive composition of the invention comprises:
(a) a non-photopolymerizable compound which has a number average molecular weight of not less than about 5000;
(b) a photopolymerizable monomer which has a molecular weight of about 200-800; and
(c) an isocyanate compound.

Further a third adhesive composition of the invention comprises:
(a) a mixture of a photopolymerizable compound which has a number average molecular weight of not less than about 3000 and at least one photopolymerizable double linkage in the molecule and a non-photopolymerizable compound which has a number average molecular weight of not less than about 5000;
(b) a photopolymerizable monomer which has a molecular weight of about 200-800; and
(c) an isocyanate compound.

The photopolymerizable compound or polymer used in the adhesive composition of the invention may be the same as those which are hereinbefore described, and for example, may be (meth)acrylate esters of polyols which contain two or more hydroxyls in the molecule, the polyols being such as polyester polyols, polyether polyols, polycaprolactones, polymers of (metha) acrylic acid derivatives, polyester urethanes or polyether urethanes; and adducts of (meth) acrylic acid esters or hydroxyalkyl (metha)acrylates to isocyanate group terminated polymers as obtained by the reaction of such polyols as above with diisocyanate compounds.

However, the photopolymerizable polymer used must have a number average molecular weight of not less than about 3000 so that it may develop a large primary adhesive strength in conjunction with a polymer produced by the irradiation of a photopolymerizable monomer, which will be described hereinafter.

The photopolymerizable polymer used in the invention contains (meth)acryloyl groups, or both of hydroxyls and (meth)acryloyl groups at the terminals of the molecule. The photopolymerizable polymer is contained in the adhesive composition usually in amounts of about 5-70% by weight based on the composition.

In accordance with the invention, the above photopolymerizable polymer may be partially or wholly displaced by a non-photopolymerizable polymer, which is any polymer having no photopolymerizable double linkage in the molecule, but has a number average molecular weight of not less than about 5000 so that it may develop a large primary adhesive strength in conjunction with a polymer produced by the irradiation of a photopolymerizable monomer.

The non-photopolymerizable compound usable includes vinyl polymers, polyesters, polyethers, polyester urethanes, polyether urethanes and polycaprolactones, and is contained in the composition usually in amounts of about 5-70% by weight based on the composition. Further according to the invention, both of the photopolymerizable compound and the non-photopolymerizable compound may be incorporated into the adhesive composition. In this case also, the polymers are contained in the adhesive composition in total usually in amounts of about 5-70% by weight based on the composition.

Now turning to a photopolymerizable monomer, it is preferably a (meth)acrylate ester which has a molecular weight of about 200-800 and has at least one photopolymerizable (meth)acryloyl group in the molecule. The photopolymerizable (meth)acrylate ester may be used together with N-vinyl-2-pyrrolidone in the adhesive composition of the invention.

Preferred examples of such (meth)acrylate esters include (meth)acrylate esters of phenol- or alkylphenol-alkylene oxide adducts represented by the general formula of wherein $R^1$ represents hydrogen or alkyl; $R^2$ and $R^3$ independently represent hydrogen or methyl; and n is a positive integer, but not less than 2 when all the $R^1$, $R^2$ and $R^3$ are hydrogens; mono(meth)acrylates of polyalkylene glycols; dicyclopentenyloxyethyl (meth)acrylates; polycaprolactone (meth)acrylates represented by the general formula of wherein R represents hydrogen or methyl; and n is a positive integer not less than 2; ε-caprolactone-modified 2-hydroxyethylmethacrylates; (meth)acrylates of tetrahydrofurfuryl alcohol-caprolactone adducts, or adducts of (metha)acrylic acid to monoepoxy compounds, e.g., 2-hydroxy-3-phenoxypropyl (meth)acrylate.

These photopolymerizable monomers effectively function in the presence of the aforesaid high molecular weight photopolymerizable polymers or non-photopolymerizable polymers, and ensure a high coatability without the use of diluents such as have low molecular weights of not more than about 200, but also form, in cooperation with the aforesaid photopolymerizable compound or non-photopolymerizable polymers, an adhesive which has a large primary adhesive strength by the irradiation-induced photopolymerization. However, when the molecular weight of the photopolymerizable monomer is smaller than about 200, then the monomer is suitable as diluents, but unusable because of toxicity and bad smell, whereas when the molecular weight is larger than about 800, then the monomer is deficient in ability as diluents. The preferred molecular weight of the photopolymerizable monomer is about 220-500.

The photopolymerizable monomer is contained in amounts of about 5-80% by weight in the adhesive composition of the invention.

Any polyisocyanate compound which has two or more isocyanate groups in the molecule is usable as the isocyanate compound in the adhesive composition of the invention, and preferred examples thereof are described hereinbefore. Other examples of the polyisocyanate compound usable are adducts of polyhydric alcohols such as trimethylolpropane or polyester polyols to the diisocyanates, and further such compounds as obtained by reacting polyisocyanates at a part of the isocyanate groups with compounds having both hydroxyls and (meth)acryloyl groups such as 2-hydroxyalkyl (metha)acrylate.

The polyisocyanate compound is contained in amounts of about 5-70% by weight in the adhesive composition of the invention.

Further in connection with the polyisocyanate compound, since it is in general unstable so that the adhesive composition of the invention may be, if necessary, provided as a two part adhesive, and the isocyanate compound may be admixed with the other part when being used.

The adhesive composition of the invention may further contain, if necessary, photopolymerizable compounds which have one or more photopolymerizable (meth)acryloyl groups in the molecule, such as urethane (meth)acrylates, ester (meth)acrylates, epoxy (meth)acrylates or polyfunctional (meth)acrylates other than the aforesaid photopolymerizable polymers. A diversity of these photopolymerizable polymers are already well known, and many examples are described in, for example, Japanese Patent Disclosure (Unexamined) No. 60-168776. As described hereinbefore, the adhesive composition may further contain various additives which are known per se, if needed, such as photosensitizers, photopolymerization accelerators, fillers, antioxidants, stabilizers, tackifiers, plasticizers, levelers, or curing agents for the polyisocyanate compound such as polyols or the other compounds described hereinbefore.

In the use of the adhesive composition of the invention, it is first coated on a sheet or film, or a substrate or on both of these, by any application means such as described hereinbefore, and is then irradiated so that both of the photopolymerizable polymers and the photopolymerizable monomers photopolymerize, thereby forming an adhesive on the substrate. Then, the sheet or film is wrapperd around and laminated to a substrate usually at room temperatures. When desired, the lamination may be carried out at elevated temperatures either by heating whole of the substrate or by heating the adhesive face only. When especially a large primary adhesive strength is intended, it is preferred that the ingredients contained in the composition are selected so as to provide an adhesive which has a high softening point and that the sheet or film is laminated to a substrate at elevated temperatures.

As set forth above, the adhesive composition of the invention comprises a photopolymerizable polymer or a non-photopolymerizable polymer either of which has a fixed range of the number average molecular weight, a low molecular weight photopolymerizable monomer, and an isocyanate compound, and thereore, it forms an adhesive having a large primary adhesive strength by being irradiated. Therefore, the use of the adhesive composition of the invention makes it possible to laminate a sheet or film to a substrate with neither lifting nor separation immediately after the application of radiations to the adhesive composition, to ensure a high productivity in the production of laminated products. Further the adhesive composition of the invention needs no evaporation of organic solvents when being applied, so that there arises no problem concerning hygiene and safety, nor is there generated a bad acrylic smell.

After the lamination of a sheet or film to a substrate, as already described, the adhesive composition may be either secondarily cured by heating, or left standing at room temperatures to spontaneously moisture cure. The adhesive composition according to the invention contains a photocurable component and a chemically curable component, so that the secondary cure of the chemically curable component forms three dimensional structures of components, to provide an especially strong adhesion between a sheet or film and a substrate.

The invention will be more easily understood with reference to the following examples, which however are intended to illustrate the invention only and are not to be construed as limiting the scope of the invention. In the examples, weights and percentages are by weight.

EXAMPLE 1

An amount of 45 parts of an adduct of trimethylolpropane/tolylene diisocyanate in a molar ratio of ⅓ as an isocyanate compound, 45 parts of crude diphenylmethane diisocyanate and 10 parts of phenyl diethylene glycol acrylate were mixed uniformly, to provide a base resin 1 having an amine equivalent of 190.

An amount of 331 parts of isophthalic acid, 402 parts of sebacic acid, 376 parts of neopentyl glycol and 73 parts of ethyleneglycol were reacted together to provide a polyester polyol having an OH equivalent of 1250.

An amount of 100 parts of the polyester polyol, 7.78 parts of hydrogenated xylylene diisocyanate and 60 parts of phenyl diethylene glycol acrylate were fed into a four necked flask, and were then reacted at 85° C. for 5 hours. When the amine equivalent reached 6500, 3.5 parts of 2-hydroxyethyl acrylate was added quickly to the resultant mixture, and the mixture was further reacted at 85° C. for 5 hours, to provide a solution A having an amine equivalent not less than 80000.

This solution was found to have a composition of:

| | |
|---|---|
| urethane acrylate | 170.8 parts |
| photopolymerizable compounds: | |
| phenyl diethylene glycol acrylate | 60.0 parts |
| 2 hydroxyethyl acrylate | 0.5 parts. | and was found to have a viscosity of 28000 cps at 25° C., and an OH equivalent of 5680.

An amount of 100 parts of the solution A, 3 parts of glycerol monoacrylate, 8 parts of caster oil and 5 parts of 2-hydroxy-2-methylpropiophenone were mixed togeter to provide a curing agent 1 having an OH equivalent of 1416.

Figure 1:
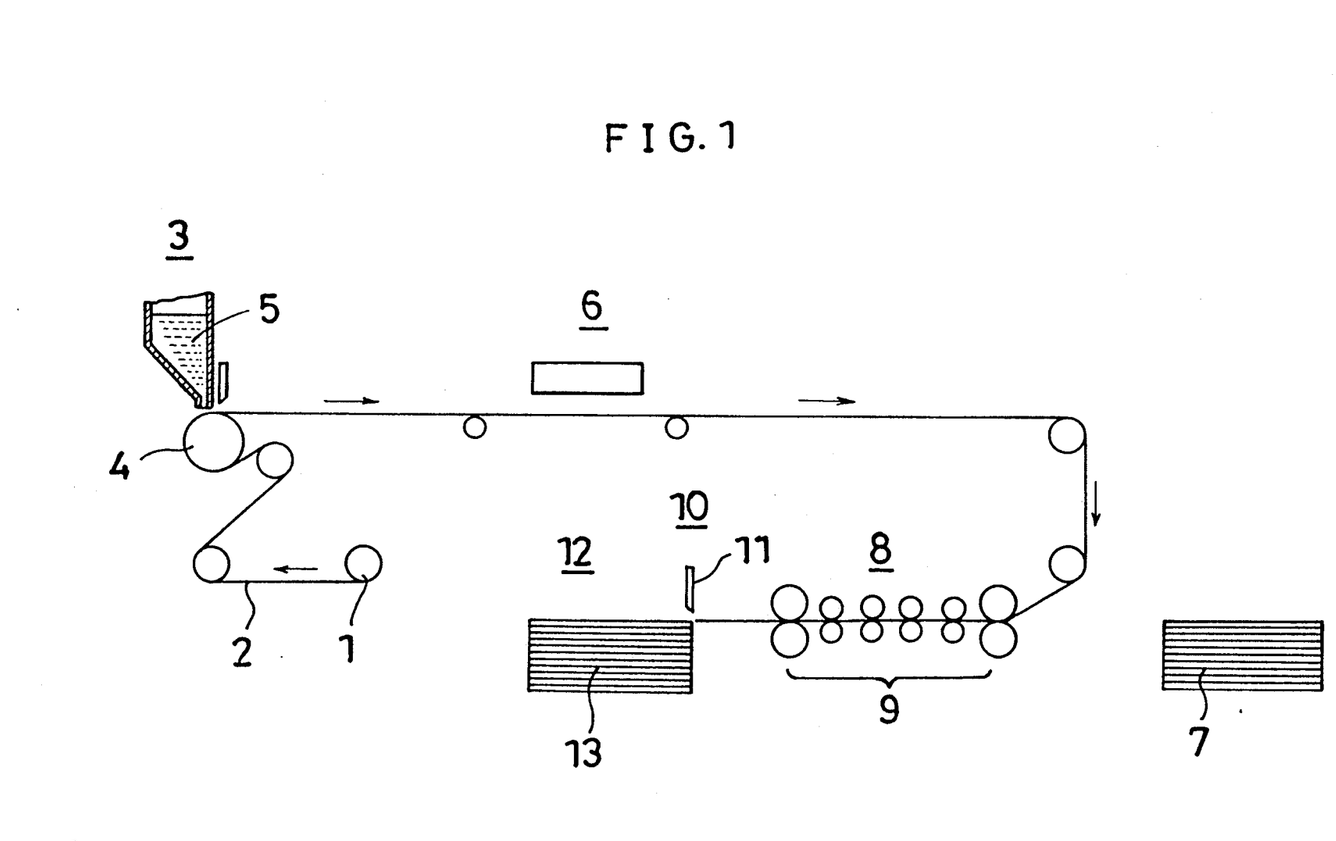
FIG. 1 illustrates a profile lapping machine.

Then, 40 parts of the base resin 1 and 100 parts of the curing agent 1 were mixed together, to provide an adhesive composition, and by use of a profile lapping or coating machine as shown in FIG. 1, polyvinyl chloride film was laminated to a particle board having a deformed cross section and curved surfaces.

FIG. 1 illustrates an example of a profile lapping machine, which is composed of feed roll 1 which feeds continuously a sheet or film 2 to a coating station 3 which is provided with a coater 4 to coat an adhesive composition 5 on the sheet or film, an ultraviolet irradiating station 6 to irradiate the adhesive composition on the sheet or film, a substrate feeder (not shown) which feeds a substrate 7 of a predetermined length at the same speed as that of the sheet or film to the laminating station 8 to lap and wrap the sheet or film around the substrate and laminate it to the curved surfaces of the substrate with pressing rolls 9, a cutting station 10 to cut the sheet or film in accordance with the length of the substrate with a cutter 11, and a stocking station 12 to stock the resultant profile laminated products 13.

Figure 2:
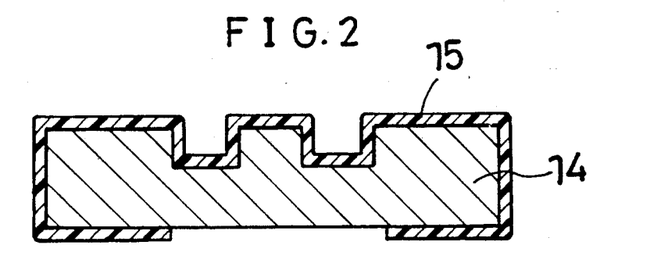
FIGS. 2, 3, and 4 show various profiles of lapped and wrapped particle board products.

In this Example, a medium hard polyvinyl chloride film of 200 μm thick was continuously fed to the coating station from the feed roll at a speed of 20 m/minute, and the adhesive composition was continuously coated in a thickness of 40 μm on the film with a knife over roll coater. Then, the film was irradiated for 3 seconds by use of a high pressure mercury lamp with an irradiating portion of 1 m long placed 10 cm apart right over the film. Then particle boards 14 of 2 m long which had cross sections and curved surfaces as shown in FIG. 2 were fed one by one to the laminating station from the feeding station. The film 15 was then lapped over and wrapped around the particle board, laminated and pressed to the board, followed by cutting the film to the length of the substrate, thereby to provide profile lapped products, as the cross section of the product is shown in FIG. 2.

There was found no lifting on the product. After standing at 30° C. for 2 days, the product was found to have an 180° peeling strength of 3.2 kg/25 mm at a peeling rate of 200 mm/minute at 23° C. under a relative humidity of 50% with the adhesion failure occured in the particle board.

EXAMPLE 2

An amount of 100 parts of an adduct of trimethylolpropane/tolylenediisocyanate in a molar ratio of ⅓ as an isocyanate compound was dissolved in 40 parts of methyl methacrylate, to provide a base resin 2 having an amine equivalent of 310.

An amount of 340 parts of isophthalic acid, 100 parts of adipic acid, 110 parts of neopentyl glycol, 160 parts of hexylene glycol and 80 parts of ethylene glycol were reacted to provide a polyester polyol having an OH equivalent of 2000.

An amount of 100 parts of the polyester polyol was mixed together with 50 parts of methyl methacrylate, 5 parts of hydroxyethyl methacrylate, 0.3 parts of N,N-diethylaminoethyl methacrylate and 1.3 parts of methyl benzoylformate, to provide a curing agent 2 as a uniform solution having an OH equivalent of 1770.

Figure 3:
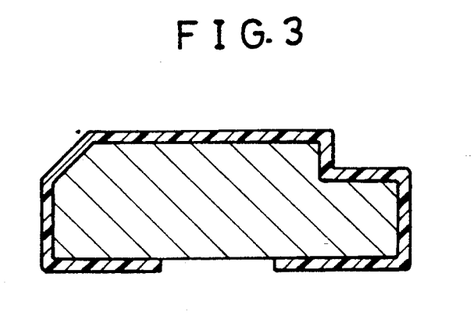

Then, 100 parts of the base resin 2 and 380 parts of the curing agent 2 were mixed together, to provide an adhesive composition. By use of this adhesive composition, medium hard polyvinyl chloride film of 200 μm thick was laminated to a lauan plywood which has a cross section and curved surfaces as shown in FIG. 3.

In this Example, the polyvinyl chloride film was fed at a speed of 30 m/minute, and the adhesive composition was continuously coated in a thickness of 60 μm on the film, and then the film was irradiated for 1.5 seconds by use of a high pressure mercury lamp with an irradiating portion of 75 cm long placed 10 cm apart right above from the film. The other conditions were the same as in Example 1.

The resultant profile lapped product had no lifting on the uneven surfaces. After standing at 25° C. for 2 days, the product was found to have an 180° peeling strength of 3.8 kg/25 mm at a peeling rate of 200 mm/minute at 23° C. under a relative humidity of 50% with the adhesion failure occurred in the resin film.

EXAMPLE 3

An amount of 60 parts of Epoxy Ester 3002A (Kyoeisha Yushi Kogyo K.K., Japan), i.e., an epoxy diacrylate having a vinyl equivalent of 300 and a viscosity of 50000 cps at 25° C., 15 parts of n-butyl acrylate, 15 parts of 2-ethylhexyl acryale, 10 parts of glycidyl methacrylate and 3 parts of 2-hydroxy-2-methylpropiophenone were admixed with an amount of 100 parts of an epoxy resin (Epotohto YD-128 by Tohto Kasei K.K., Japan) having an epoxy equivalent of 189 and a viscosity of 13000 cps at 25° C., to provide a base resin 3.

An amount of 572 parts of a dimer acid (Versadyme 288 having an acid number of 196 by Nippon Henkel K.K., Japan) were reacted with 295 parts of triethylenetetramine to provide a polyamide amine. To 100 parts of the polyamide amine were mixed 5 parts of 2,4,6-tris(-dimethylaminomethyl)phenol to provide a curing agent 3 as a solution having a viscosity of 1300 cps at 25° C.

Then, 100 parts of the base resin 3 and 43 parts of the curing agent 3 were mixed together, to provide an adhesive composition. The composition was coated in a thickness of 100 μm on an iron plate which had been polished with a #240 sand paper, and was irradiated for 15 seconds by use of a high pressure mercury lamp placed apart 10 cm from the iron plate. Then polyethylene terephthalate film of 50 μm thick was laminated to the iron plate so that the adhesive surface area was 25×25 mm². Immediately after the lamination, the resultant product was connected with an weight of 4 kg at the portion of the film which was not adhered to the iron plate, and was left standing at 25° C. for one day, but the film was found to be adhered firmly to the iron plate, and there was no slip or shift therebetween.

Figure 4:
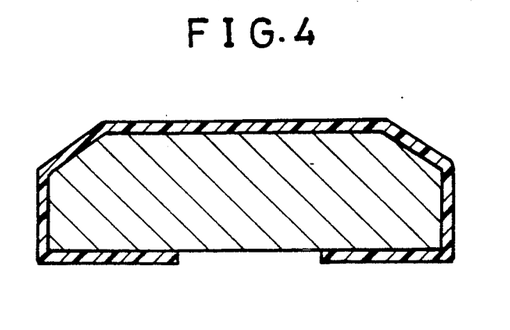

As a further example, the same adhesive composition as the above was coated in a thickness of 100 μm on a resin sheet of 0.5 mm thick composed of a sliced veneer having melamine resin impregnated therewith, and was then irradiated in the same manner as above. Thereafter, while the layer of the adhesive composition was exposed to air heated to 100° C., the resin sheet was lapped over and laminated to an aluminum plate having a cross section and uneven surfaces as shown in FIG. 4, followed by standing at 25° C. for 24 hours as it was. The product was however found to have no lifting of the film.

EXAMPLE 4

An amount of 331 parts of isophthalic acid, 402 parts of sebacic acid, 376 parts of neopentyl glycol and 73 parts of ethylene glycol were reacted together, to provide a polyester polyol having an OH equivalent of 1250.

An amount of 100 parts of the polyester polyol and 500 parts of crude diphenylmethane diisocyanate were reacted to provide an isocyanate compound having an amine equivalent of 170 and a viscosity of 3000 cps at 25° C., which was used in this Example as a base resin 4.

An amount of 270 parts of the polyester polyol, 15.6 parts of cyclohexanedimethanol, 8.35 parts of hydroxyethyl methacrylate and an acrylate P-550A as beforementioned were placed in a four necked flask, heated to 70° C., to provide a uniform solution. To the solution were added 37.6 parts of 2,4-tolylenediisocyanate, and the resultant mixture was reacted at 80° C. for 3 hours, to provide a solution B having an amine equivalent of not less than 150000.

An amount of 100 parts of the solution B, 5 parts of 2,2-dimethoxy-2-phenylacetophenone and 32 parts of dichloromethane were mixed together, to provide a curing agent 4.

Then, 40 parts of the above base resin and 100 parts of the curing agent 4 were mixed together, to provide an adhesive composition. By use of this adhesive composition, medium hard polyvinyl chloride film of 200 μm thick was laminated to a particle board having a deformed cross section and curved surfaces.

In this Example, the polyvinyl chloride film was irradiated for 1 second by use of a high pressure mercury lamp with an irradiating portion of 75 cm long placed 10 cm apart right over the film under otherwise the same conditions as in Example 1.

The resultant profile lapped product had no lifting on the uneven surfaces. After standing at 25° C. for 4 days, the product was found to have an 180° peeling strength of 3.5 kg/25 mm at a peeling rate of 200 mm/minute at 23° C. under a relative humidity of 50% with the adhesion failure occurred in the resin film.

EXAMPLE 5

An amount of 331 parts of isophthalic acid, 402 parts of sebacic acid, 376 parts of neopentyl glycol and 73 parts of ethylene glycol were reacted together to provide a polyester polyol having an OH equivalent of 1250.

An amount of 100 parts of the polyester polyol and 500 parts of crude diphenylmethane diisocyanate were reacted to provide an isocyanate compound having an amine equivalent of 170 and a viscosity of 3000 cps at 25° C., which was used in this Example as a base resin 5.

An amount of 270 parts of the polyester polyol, 15.6 parts of cyclohexanedimethanol, 8.35 parts of hydroxyethyl acrylate and 110 parts of an acrylate P-550A as a photopolymerizable vinyl monomer as beforementioned were placed in a four necked flask, heated to 70° C., to provide a uniform solution. To the solution were added 37.6 parts of 2,4-tolylenediisocyanate, and the resultant mixture was reacted at 80° C. for 3 hours, to provide a solution C having an amine equivalent of not less than 150000.

The solution contained a photopolymerizable polymer having urethane structures composed of the polyester polyol and cyclohexanedimethanol as polyhydric compounds and 2,4-tolylenediisocyanate, and terminated by hydroxyethyl acrylate through the urethane linkage formed by the reaction of the hydroxyl with the isocyanate group of 2,4-tolylenediisocyanate, and having a number average molecular weight of about 4600.

An amount of 100 parts of the solution C, 10 parts of N-vinyl-2-pyrrolidone, 5 parts of 2,2-dimethoxy-2-phenylacetophenone and 20 parts of dichloromethane were mixed together, to provide a curing agent 5.

Then, 40 parts of the above base resin 5 and 100 parts of the curing agent 5 were mixed together, to provide an adhesive composition. The adhesive composition was coated in a thickness of 50 μm on medium hard polyvinylchloride film of 200 μm thick.

In this Example, the film was continuously fed at a speed of 15 m/minute to the irradiation station provided with two 80 W/cm high pressure mercury lamps, and the film was laminated to a particle board which had a cross section and curved surfaces while heating the particle board to 50° C.

The resultant profile lapped product was left standing at 25° C. for four days, and was found to have an 180° peeling strength of 2.5 kg/25 mm at a peeling rate of 200 mm/minute at 23° C. under a relative humidity of 50%.

EXAMPLE 6

An amount of 270 parts of the same polyester polyol as obtained in Example 5, 15.6 parts of cyclohexanedimethanol, 8.35 parts of 2-hydroxyethyl acrylate, 82.9 parts of the same acrylate P-550A as mentioned before were placed in a four necked flask, heated to 70° C., to provide a uniform solution. To the solution were added 37.6 parts of 2,4-tolylene diisocyanate, and the resultant mixture was reacted at 80° C. for 3 hours, to provide a solution D having an amine equivalent of not less than 150000.

The solution contained a photopolymerizable polymer having urethane structures composed of the polyester polyol and cyclohexanedimethanol as polyhydric compounds and 2,4-tolylenediisocyanate, and terminated by hydroxyethyl acrylate through the urethane linkage formed by the reaction of the hydroxyl with the isocyanate group of 2,4-tolylenediisocyanate, and having a number average molecular weight of about 4600.

An amount of 100 parts of the solution D, 5 parts of 2,2-dimethoxy-2-phenylacetophenone and 32 parts of dichloromethane were mixed together, to provide a curing agent 6.

Then, 40 parts of the same base resin as used in Example 5 and 100 parts of the above curing agent 6 were mixed together, to provide an adhesive composition. The adhesive composition was coated in a thickness of 50 μm on medium hard polyvinyl chloride film of 200 μm thick, which was then passed at a speed of 9 m/minute under a 80 W/cm high pressure mercury lamp placed 10 cm apart from the film to be irradiated, followed by laminating to a particle board which had a cross section and curved surfaces while the board was heated to 50° C.

The resultant profile lapped product was left standing at 25° C. for four days, and was found to have an 180° peeling strength of 3.5 kg/25 mm at a peeling rate of 200 mm/minute at 23° C. under a relative humidity of 50%.

What is claimed is:

1. An adhesive composition for profile lapping which consists essentially of:
   (A) a photopolymerizable polyester-polyurethane-polyacrylate or polyester-polyurethane-polymethacrylate which has a number average molecular weight of not less than about 3000 and at least one photopolymerizable acryloyl or methacryloyl group together with one to three hydroxy groups in the molecule in an amount of 5–70% by weight;
   the photopolymerizable polyester-polyurethane-polyacrylate or polyester-polyurethane-polymethacrylate being an adduct of (a) a vinyl monomer having hydroxyl groups in its molecule, to (b) a polyester urethane;
   the vinyl monomer (a) being at least one member selected from the group consisting of N-methylol acrylic amide, N-methylol methacrylic amide, hydroxyethyl acrylate, hydroxyethyl methacrylate, hydroxypropylacrylate, hydroxypropyl methacrylate, pentaerythritol monoacrylate, pentaerythritol monomethacrylate, allyl alcohol, monoacrylate esters of polyethylene glycol, monomethacrylate esters of polyethylene glycol, monovinyl ethers of ethylene glycol or polyethylene glycol, monovinyl ethers of propylene glycol or polypropylene glycol and a vinyl monomer represented by the formula of $CH_2=CHCOOCH_2CH_2OCO(CH_2)_5OH$;

the polyester urethane (b) being produced by the reaction of a polyester polyol (i) with a polyisocyanate (ii);
   the polyester polyol (i) being produced by the reaction of a polybasic carboxylic acid or a polybasic carboxylic anhydride with a polyhydric alcohol;
   the polybasic carboxylic acid or polybasic carboxylic anhydride being at least one member selected from the group consisting of maleic acid, succinic acid, adipic acid, fumaric acid, phthalic acid, terephthalic acid, isophthalic acid, methylterephthalic acid, methyltetrahydrophthalic acid, tetrahydrophthalic acid, sebacic acid, dodecanedioic acid, azelaic acid, glutaric acid, trimellitic acid, hexahydrophthalic acid, dimer acid and their anhydrides;
   the polyhydric alcohol being at least one member selected from the group consisting of ethylene glycol, propylene glycol, butylene glycol, hexylene glycol, decanediol, neopentyl glycol, diethylene glycol, dipropylene glycol, glycerine, trimethylolpropane, 1,4-cyclohexanedimethanol, neopentyl glycol ester of hydroxypivalic acid, 1,4-cyclohexanediol and hydrogenated bisphenol A;
   the polyisocyanate (ii) being at least one member selected from the group consisting of tolylene diisocyanate, diphenylmethane diisocyanate, 3,3'-dimethyldiphenylmethane-4,4'-diisocyanate, naphthylene-1,5-diisocyanate, phenylenediisocyanate, xylylenediisocyanate, 1,6-hexamethylenediisocyanate, 1,4-tetramethylenediisocyanate, isophorone diisocyante, hydrogenated tolylenediisocyanate, hydrogenated diphenylmethanediisocyanate, hydrogenated xylylenediisocyanate, and their dimers and trimers;
   (B) a photopolymerizable monomer which has a molecular weight of about 200–800 and a single photopolymerizable acryloyl group or methacryloyl group, the monomer being represented by the:

wherein R[1] represents hydrogen or alkyl; R[2] and R[3] independently represent hydrogen or methyl; and n is a positive integer, but not less than 2 when all the R[1], R[2] and R[3] are hydrogens;

(C) a polyisocyanate compound in an amount of 5-70% by weight, based on the composition.

2. The adhesive composition as claimed in claim 1 wherein the adhesive composition further contains a photosensitizer in amounts of about 0.01-20 parts by weight in relation to 100 parts by weight of the total of the photopolymerizable polyester of (A) compound and the photopolymerizable monomer of (B).

3. The adhesive composition as claimed in claim 1 wherein polyisocyanate (C) is a reaction product of a monomeric polyisocyanate compound with a polyester-polyol.

* * * * *